June 29, 1926. 1,590,558

D. STENHOUSE

ADJUSTABLE TIME AND PHASE DISTRIBUTING VALVE

Filed May 7, 1925 3 Sheets-Sheet 1

Inventor

David Stenhouse

By Eccleston & Eccleston

Attorneys.

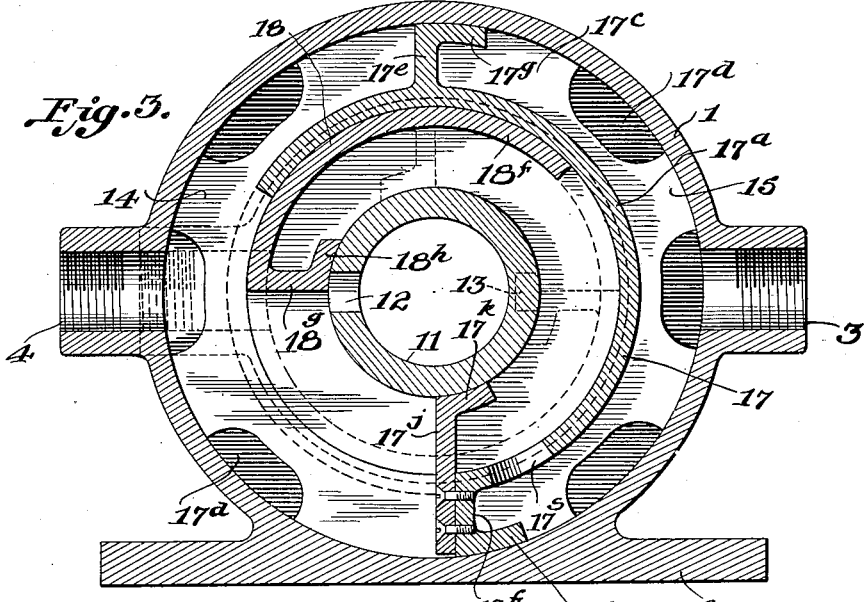

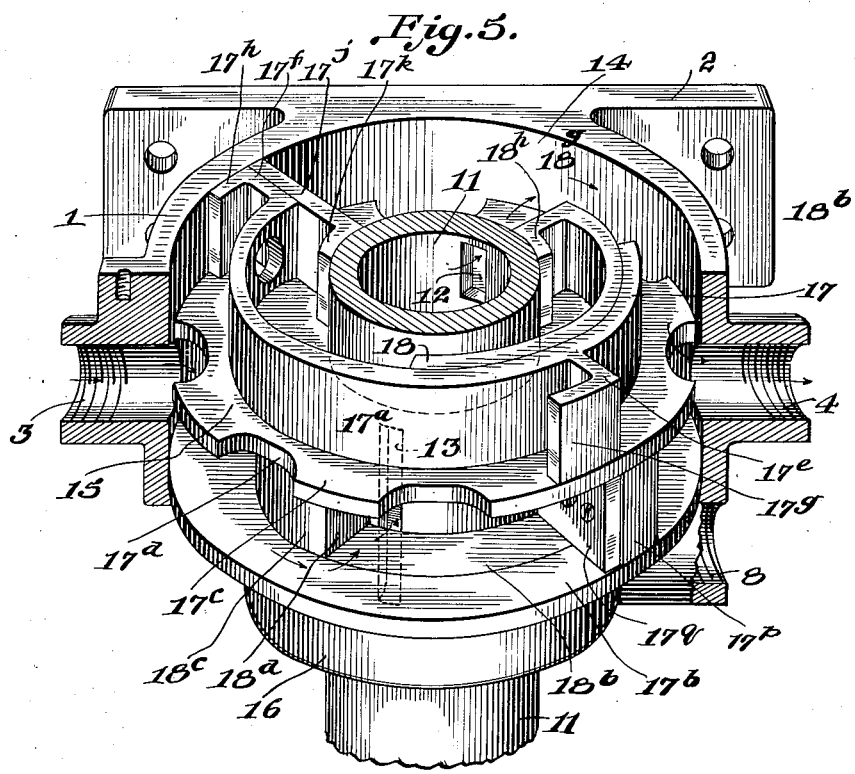

Patented June 29, 1926.

1,590,558

UNITED STATES PATENT OFFICE.

DAVID STENHOUSE, OF WASHINGTON, PENNSYLVANIA.

ADJUSTABLE TIME AND PHASE DISTRIBUTING VALVE.

Application filed May 7, 1925. Serial No. 28,750.

This invention relates to valve mechanisms and has particular reference to a valve for controlling the admission of fluid under pressure such as air, steam and the like to any machine adapted to be operated by such motive power, and while the embodiment of the invention shown on the accompanying drawings and hereinafter described is especially intended for use with a glass machine, it is to be understood that the same is equally useful in any type of machine in which fluid pressure is employed as a motive power.

In many of the glass machines now in use air under pressure is conducted to a plurality of cylinders for operating the several parts of the machine, and it is necessary that these several parts be properly coordinated and have a special phase relation which must be varied at such times as it is desired to change the output of the machine. Therefore, it has been customary to provide a plurality of cams, usually on a single shaft, for operating the valves controlling the various cylinders. Under these conditions if it is desired to alter the phase of operation of the parts or to vary the length of time during which any particlular cylinder is open to the fluid pressure, it is necessary to shut down the machine in order that the relative positions of the cams may be varied or different cams substituted. Obviously, such an interruption to the operation of a machine presents many objectionable features, among which may be mentioned loss of production of the machine and idleness of the workmen employed, as well as keeping in stock a large number and variety of cams.

It is an object of the present invention to overcome the foregoing difficulties by providing a valve mechanism which may be adjusted to vary the duration of stroke in either direction of the piston with which the valve is associated, and which may also be adjusted to vary the phase of operation of its cylinder with respect to the other pressure-operated parts of the mechanism.

A further object of the invention resides in the provision of such a valve which may be manipulated to make the necessary adjustments while the machine is in operation.

Other objects and advantages of the invention will be apparent from the following description when taken in connection with the accompanying drawings, in which:

Figure 3 is a horizontal section taken on line 3—3 of Figure 2.

Figure 4 is a horizontal section taken on line 4—4 of Figure 2,

Figure 5 is a perspective view of the valve mechanism; parts of the casing being broken away to more clearly show the interior construction, and;

Figure 6 is a diagrammatic view showing two cylinders and valves associated in a single machine.

Figure 1:
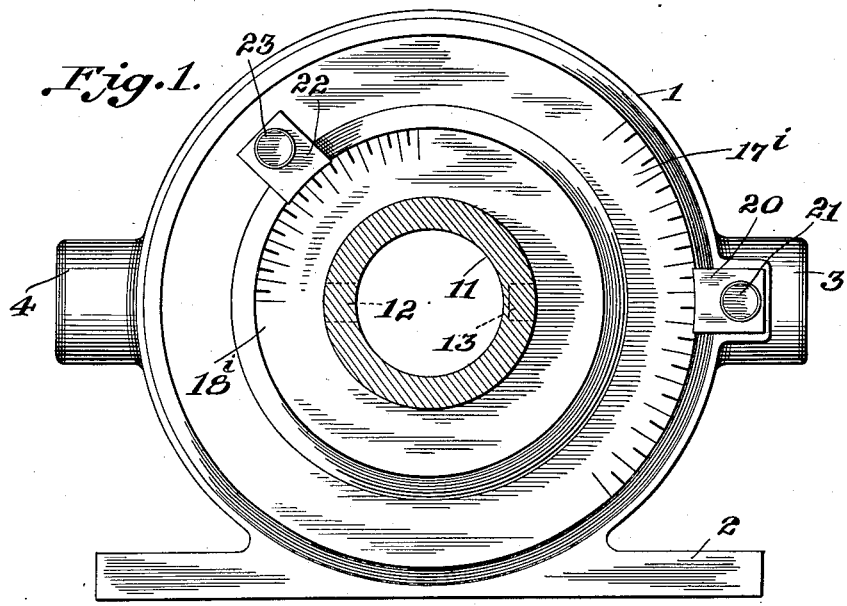
Figure 1 is a plan view of the valve mechanism, the supply pipe being shown in section.

More specifically, the numeral 1 indicates a cylindrical valve casing provided with a bracket 2, which is preferably though not necessarily integrally connected with the casing, and which forms a means by which the casing may be suitably supported on the frame of the glass machine or the like. Each valve is of course operatively associated with a pressure cylinder for operating some particular part of the mechanism, and to this end the casing 1 is provided with two ports 3 and 4 which are connected by pipes 5 and 6 (Fig. 6) with opposite ends of a cylinder 7, and an exhaust passage 8 which opens to the atmosphere. It will be understood that any number of these valves may be employed as found necessary, and in Figure 6 I have shown a second valve 9 which is operatively associated with a cylinder 10.

For the purpose of conveying fluid under pressure to each of the distributing-valves to be later described in detail, a pipe 11 is provided which is rotatably mounted and which extends centrally through each valve casing 1. The pipe is formed with a lateral opening 12 for each valve and is designed to admit the fluid pressure to the interior of the valve casing. The exterior wall of the pipe 11 is provided with a vertically extending groove 13 by means of which the exhaust from the cylinder is conducted to the atmosphere, as will appear hereinafter.

As hereinbefore stated the present invention relates to a construction by which the duration of the stroke of a piston in either direction may be varied, and also one in which the phase of operation of the piston with respect to other working parts of the mechanism may be advanced or retarded, such adjustments being adapted to be made while the machine is in operation; and I will now describe the mechanism by which these results may be accomplished.

Figure 2:
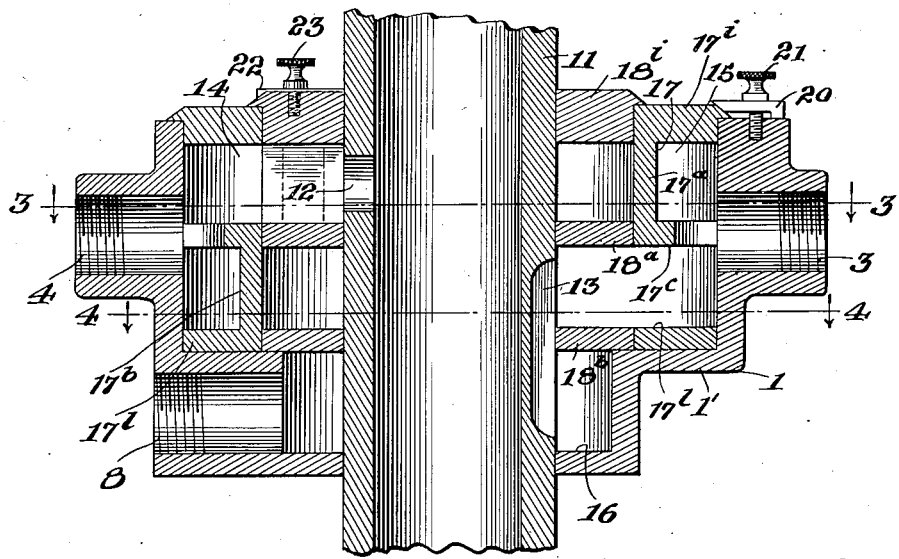
Figure 2 is a vertical sectional view of the construction shown in Figure 1.

Each valve casing 1 is formed into two pressure compartments and an exhaust compartment, each of the former communicating with a port 3 or 4 of the casing and the latter communicating with the exhaust passage 8. These compartments are designated generally by the numerals 14, 15 and 16, and are formed by two partitions 17 and 18. The partition 17 is formed of two arc-shaped portions 17$^a$ and 17$^b$ disposed respectively above and below an annular plate 17$^c$ which is provided with the peripheral openings 17$^d$. The section 17$^a$ of partition 17 is provided with two radially disposed webs 17$^e$ and 17$^f$ carrying arc-shaped wings 17$^g$ and 17$^h$ respectively for cooperation with the inner surface of the casing 1. These parts are integrally formed as is also the graduated annular plate 17$^i$ shown in Figures 1 and 2. The web 17$^f$ has rigidly connected thereto an inwardly extending web 17$^j$ terminating in an arc-shaped wing 17$^k$ for cooperation with the pipe 11; this plate is preferably made separable from the main body of the partition in order to facilitate assembling of the parts.

The arc-shaped portion 17$^b$ which is below the plate 17$^c$ and integral therewith is substantially identical with the portion 17$^a$ and comprises the radially disposed webs 17$^m$ and 17$^n$ carrying the arc-shaped wings 17$^o$ and 17$^p$ respectively for cooperation with the casing wall, and the inwardly directed web 17$^q$ terminating in the arc-shaped wing 17$^r$ for cooperation with the pipe 11. The lower portion of the partition 17 is also provided with an annular plate 17$^l$ which rests on an inward offset 1' of the casing 1 thereby forming a bearing for the partition 17 when being moved to its various positions of adjustment to be later described.

It will thus be seen that the partition 17 is composed of the horizontally arranged plates 17$^c$ and 17$^l$ and the arc-shaped portions 17$^a$ and 17$^b$ disposed respectively above and below the plate 17$^c$. It will also be noted that the disposition of the webs 17$^e$, 17$^f$, 17$^m$ and 17$^n$ is such as to divide the spaces above and below the plate 17$^c$ into two semi-circular compartments, while the inwardly directed webs 17$^j$ and 17$^q$ cooperate with the other webs to be now described so as to divide the space inwardly of the portions 17$^a$ and 17$^b$ into adjustable compartments.

The second adjustable partition of the valve mechanism has previously been referred to by the reference numeral 18, and this element comprises the vertically spaced horizontally arranged plates 18$^a$ and 18$^b$ which are integrally connected by means of the arc-shaped portion 18$^c$, the latter being provided with the inwardly directed web 18$^d$ which terminates in the arc-shaped wing 18$^e$ for cooperation with the pipe 11. Also integrally formed with the plate 18$^a$ and extending thereabove is the arc-shaped portion 18$^f$ which carries the inwardly directed web 18$^g$ terminating in the arc-shaped wing 18$^h$ for cooperation with the pipe 11. It will be noted from an inspection of Figures 2 and 3 that this last described partition also seats on the inwardly-directed offset 1' of the casing 1 and that the arc-shaped portions 18$^c$ and 18$^f$ are slidably disposed with respect to the arc-shaped portions 17$^b$ and 17$^a$ of the partition 17. Furthermore, the plate 18$^b$ co-operates with the casing 1 to form the exhaust compartment 16. Partition 18 is also formed with a graduated annular plate 18$^i$ corresponding with the plate 17$^i$ and concentrically arranged with respect thereto. As will be observed from Figure 2 of the drawings the plate 17$^i$ may be secured against movement with respect to the casing 1 by means of the clamp 20 and set screw 21, while the plate 18$^i$ may be locked with respect to the plate 17$^i$ by means of the clamp 22 and set screw 23.

In order that the fluid pressure may pass from one side to the other of the partition sections 17$^a$ and 17$^b$ at certain times these sections are provided with the apertures 17$^s$ and 17$^t$ respectively, as will be more fully described in the description of the operation of the valve mechanism to follow.

From the construction shown and described it will be seen that the compartment 14 into which the port 4 opens is bounded by a portion of the casing wall the vertical walls 17$^e$, 17$^j$, 17$^n$, 17$^q$, 17$^m$, 18$^d$, 18$^g$, parts of the arc-shaped segments 17$^a$, 17$^b$, 18$^f$, 18$^c$, a portion of the pipe 11, and by horizontal walls consisting of the plates 17$^i$, 18$^i$, 17$^l$ and 18$^b$; that the compartment 15 into which the port 3 opens is bounded by the opposite sides of these same movable elements except plate 18$^l$ which forms no part of the compartment 15; and that the exhaust compartment 16 is bounded by the casing 1 and the plate 18$^b$.

In operation, considering the rotating pipe 11 to have reached the position shown in Fig. 3, it will be apparent that the compartment 14 has been open to fluid pressure from the opening 12 through a 90° movement of the pipe and that this compartment will be shut off from the fluid pressure as soon as the port 12 passes behind the arc-shaped wing 18$^h$. During this period of time it will be apparent that the groove 13 in the pipe 11 has been in communication with compartment 15 and will communicate with compartment 14 only after it has passed the arc-shaped wing 18ᵉ which will then permit the exhaust returning through port 4 to travel downwardly into the exhaust compartment 16 and through passage 8 to the atmosphere. It is in order that this exhaust may reach the groove 13 that the aperture 17ᵗ is provided in the partition section 17ᵇ. Obviously, the travel of the fluid pressure in compartment 15 is substantially the same as that just described. i. e., as soon as the port 12 passes the wing 18ʰ the fluid will pass from pipe 11 through opening 17ˢ to the port 3, and will continue until the port 12 is shut off by the wing 17ᵏ. The groove 13 of pipe 11 will then pass the wing 17ʳ and the exhaust will discharge through opening 17ˢ to the groove 13 until this groove passes wing 18ᵉ.

The general operation of the valve having now been described I will detail the manner in which the partitions may be adjusted to vary the duration of either stroke of a piston without varying its phase; or to vary the phase of operation of a piston without varying the duration of the strokes of the piston; or to vary the duration of the strokes of a piston as well as its phase of operation with respect to other operating parts of a machine.

Let us assume that the port 4 leads to the under side of a piston and the port 3 to the upper side thereof. Then, if it is desired to lengthen the duration of the up-stroke of the piston, the set screw 23 would be loosened so that the webs 17ʲ and 18ᵍ may be moved farther apart. The adjustment can be made while the valve is in operation and will, of course, lengthen the duration of the up-stroke and shorten the duration of the down stroke. Obviously, this adjustment may be made through 180° and when the webs 17ʲ and 18ᵍ are diametrically opposed the two strokes of the piston will be of the same duration.

If it is desired to change the phase of operation of a cylinder without altering the duration of its strokes, it is only necessary that the set screw 21 be loosened so that the plate 17ˡ, to which plate 18ˡ is secured by set screw 23, may be moved the necessary amount to bring about the desired change in the phase of operations. Such an adjustment will move the webs 17ʲ and 18ᵍ as a unit and will necessarily vary the phase of operation of the cylinder with respect to the other working parts of the machine. By loosening both set screws 21 and 23 it will be apparent that the partitions 17 and 18 may be so adjusted as to vary the duration of the two strokes of the piston as well as to vary the phase of operation with respect to other operating parts.

From the foregoing description taken in connection with the accompanying drawings it will be apparent that I have devised a comparatively simple yet reliable valve construction which not only permits of ready adjustment while in operation to change the duration of either stroke of a piston but also permits adjustment while in operation to vary the phase of operation of the particular cylinder with respect to other parts of an organized machine.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a distributing-valve for fluid pressure, a casing having a plurality of ports therein, and means associated with said casing for varying relatively the time during which said ports are open to said fluid pressure.

2. In a distributing-valve for fluid pressure, a casing having a plurality of ports therein, and means within said casing for varying relatively the time during which said ports are open to said fluid pressure.

3. In a distributing-valve for fluid pressure, a casing having a plurality of ports therein, and means operable while the valve is in operation for varying relatively the time during which said ports are open to said fluid pressure.

4. In a distributing-valve for fluid pressure, a casing having a plurality of ports therein, means within said casing for varying relatively the time during which said ports are open to said fluid pressure, said means being operable while the valve is in operation.

5. In a distributing-valve for fluid pressure, a casing having a plurality of inlet ports therein, and means associated with said casing for varying the phase of the opening of said ports.

6. In a distributing-valve for fluid pressure, a casing having a plurality of inlet ports therein, and means associated with said casing for varying the phase of the opening of said ports, said means being operable while the valve is in operation.

7. In a distributing-valve for fluid pressure, a casing having a plurality of inlet ports therein, and means associated with said casing for varying the phase of the closing of said ports.

8. In a distributing-valve for fluid pressure, a casing having a plurality of inlet ports therein, and means associated with said casing for varying the phase of the closing of said ports, said means being operable while the valve is in operation.

9. In a distributing-valve for fluid pressure, a casing having a plurality of exhaust ports therein, and means associated with said casing for varying the phase of the opening of said ports.

10. In a distributing-valve for fluid pressure, a casing having a plurality of exhaust ports therein, and means associated with said casing for varying the phase of the opening of said ports, said means being operable while the valve is in operation.

11. In a distributing-valve for fluid pressure, a casing having a plurality of exhaust ports therein, and means associated with said casing for varying the phase of the closing of said ports.

12. In a distributing-valve for fluid pressure, a casing having a plurality of exhaust ports therein, and means associated with said casing for varying the phase of the closing of said ports, said means being operable while the valve is in operation.

13. In a distributing-valve for fluid pressure, a casing having a plurality of ports therein, and means associated with said casing for varying relatively the time during which said ports are open to said fluid pressure, without varying the phase of the opening of said ports with respect to other working parts of the machine with which the valve is associated.

14. In a distributing-valve for fluid pressure, a casing having a plurality of ports therein, and means associated with said casing for varying relatively the time during which said ports are open to said fluid pressure, without varying the phase of the opening of said ports with respect to other working parts of the machine with which the valve is associated, said means being operable while the valve is in operation.

15. In a distributing-valve for fluid pressure, a casing having a plurality of inlet ports therein, and means associated with said casing for varying the phase of the opening of said ports, without varying the time during which the ports are open to said fluid pressure.

16. In a distributing-valve for fluid pressure, a casing having a plurality of inlet ports therein, and means associated with said casing for varying the phase of the opening of said ports, without varying the time during which the ports are open to said fluid pressure, said means being operable while the valve is in operation.

17. In a distributing-valve for fluid pressure, a casing having a plurality of exhaust ports therein, and means associated with said casing for varying the phase of the opening of said ports, without varying the time during which the ports are open.

18. In a distributing-valve for fluid pressure, a casing having a plurality of exhaust ports therein, and means associated with said casing for varying the phase of the opening of said ports, without varying the time during which the ports are open, said means being operable while the valve is in operation.

19. In a distributing-valve for fluid pressure, a casing having a plurality of ports therein, means associated with the casing for varying the time during which said ports are open to said fluid pressure, said means being also adjustable for advancing or retarding the phase of the opening of the ports with respect to other working parts of the machine with which the valve is associated.

20. In a mechanism including a plurality of fluid pressure cylinders, a plurality of distributing-valves for controlling the operation of said cylinders, one of said valves including means by which the phase of operation of said cylinders may be varied.

21. In a mechanism including a plurality of fluid pressure cylinders, a plurality of distributing-valves for controlling the operation of said cylinders, each of said valves including means by which the phase of operation of said cylinders may be varied.

22. In a mechanism including a plurality of flush pressure cylinders, a plurality of distributing-valves for controlling the operation of said cylinders, one of said valves including means operable while the mechanism is in operation for varying the phase of operation of said cylinders.

23. In a mechanism including a plurality of fluid pressure cylinders, a plurality of distributing-valves for controlling the operation of said cylinders, one of said valves including means by which the phase of operation of said cylinders may be varied while the duration of the strokes of the pistons remain unchanged.

24. In a mechanism including a plurality of fluid pressure cylinders, a plurality of distributing-valves for controlling the operation of said cylinders, one of said valves including means for varying the phase of operation of said cylinders and for varying the duration of the strokes of the respective pistons.

25. In a mechanism including a plurality of fluid pressure cylinders, a plurality of distributing-valves for controlling the operation of said cylinders, each of said valves including means by which the phase of operation of said cylinders may be varied while the duration of the strokes of the pistons remain unchanged.

26. In a mechanism including a plurality of fluid pressure cylinders, a plurality of distributing-valves for controlling the operation of said cylinders, each of said valves including means for varying the phase of operation of said cylinders and for varying the duration of the strokes of the respective pistons.

27. A valve mechanism including a casing having inlet and exhaust ports therein, a pipe extending through said casing and rotatably mounted with respect thereto, said pipe being provided with an opening communicating with the interior of said casing, and means within said casing to cause said rotatable pipe to communicate with said ports in succession.

28. A valve mechanism including a casing having a plurality of ports therein, a pipe extending through said casing and rotatably mounted with respect thereto, said pipe being provided with an opening communicating with the interior of said casing, and means associated with said casing for varying relatively the time during which said ports are in communication with said pipe.

29. A valve mechanism including a casing having a plurality of ports therein, a pipe extending through said casing and rotatably mounted with respect thereto, said pipe being provided with an opening communicating with the interior of said casing, and means operable while the valve is in operation for varying relatively the time during which said ports are in communication with said pipe.

30. A valve mechanism including a casing having a plurality of ports therein, a pipe extending through said casing and rotatably mounted with respect thereto, said pipe being provided with an opening communicating with the interior of said casing, partitions within said casing for dividing off the ports thereof, and a groove in the outer wall of said pipe for permitting communication between certain of the compartments formed by said partitions.

31. A valve mechanism including a casing having a plurality of ports therein, a pipe extending through said casing and rotatably mounted with respect thereto; said pipe being provided with an opening comunicating with the interior of said casing, partitions within said casing for dividing off the ports thereof, said partitions being relatively adjustable, whereby the time during which certain of said ports are in communication with said pipe may be relatively varied.

32. A valve mechanism including a casing having a plurality of ports therein, a rotatably mounted pipe having an opening in communication with the interior of said casing, and a plurality of adjustably mounted partitions within said casing for varying the time during which certain of the ports of the casing are in communication with said pipe.

33. A valve mechanism including a casing having a plurality of ports therein, a pipe extending through said casing and rotatably mounted with respect thereto, said pipe being provided with an opening communicating with the interior of said casing, and means within said casing for varying the phase of communication of said opening and said ports with respect to other working parts of the machine with which the valve is associated.

34. A valve mechanism including a casing having a plurality of ports therein, a pipe extending through said casing and rotatably mounted with respect thereto, said pipe being provided with an opening communicating with the interior of said casing, and means operable while the valve is in operation for varying the phase of communication of said opening and said ports with respect to other working parts of the machine with which the valve is associated.

35. A valve mechanism including a casing having a plurality of ports therein, a pipe extending through said casing and rotatably mounted with respect thereto, said pipe being provided with an opening communicating with the interior of said casing, partitions within said casing for dividing off the ports thereof, said partitions being adjustable to vary the phase of communication of said opening and said ports with respect to other working parts of the machine with which the valve is associated.

36. A valve mechanism including a casing having a plurality of ports therein, a rotatably mounted pipe having an opening in communication with the interior of said casing, a plurality of movably mounted partitions in said casing, and means for securing said partitions against movement with respect to said casing.

37. A valve mechanism including a casing having a plurality of ports therein, a rotatably mounted pipe having an opening in communication with the interior of said casing, a plurality of adjustably mounted partitions in said casing, means for securing said partitions in relatively adjusted positions, and means for securing said partitions in adjusted position with respect to the casing.

38. A valve mechanism including a casing having a plurality of ports therein, a rotatably mounted pipe having an opening in communication with the interior of the casing, a plurality of adjustably mounted partitions in said casing, said partitions being adjustable independently or as a unit.

39. A valve mechanism including a casing having a plurality of ports therein, a rotatably mounted pipe having an opening in communication with the interior of said casing, partitions in said casing dividing the same into two pressure compartments and an exhaust compartment, said pipe provided with a groove in its exterior wall to permit communication between each pressure compartment and the exhaust compartment.

40. A valve mechanism including a casing having a plurality of ports therein, a rotatably mounted pipe having an opening in communication with the interior of said casing, partitions mounted in said casing for circumferential adjustment and dividing the same into two pressure compartments and an exhaust compartment, said pipe provided with a groove in its exterior wall to permit communication between each pressure compartment and the exhaust compartment.

41. A valve mechanism including a casing having a plurality of ports therein, a rotatably mounted pipe having an opening in communication with the interior of said casing partitions mounted in said casing for circumferential adjustment and dividing the same into two pressure compartments and an exhaust compartment, means for securing said partitions in relatively adjusted positions, said pipe provided with a groove in its exterior wall to permit communication between each pressure compartment and the exhaust compartment.

42. A valve mechanism including a casing having a plurality of posts therein, a rotatably mounted pipe having an opening in communication with the interior of said casing, partitions mounted in said casing for circumferential adjustment and dividing the same into two pressure compartments and an exhaust compartment, means for securing said partitions in relatively adjusted positions, means for securing said partitions in adjusted position with respect to the casing, said pipe provided with a groove in its exterior wall to permit communication between each pressure compartment and the exhaust compartment.

43. A valve mechanism including a casing having ports leading to opposite ends of a cylinder and an exhaust port, partitions dividing said casing into two pressure compartments and an exhaust compartment, a rotatably mounted pipe having an opening for successive communication with the pressure compartments and a groove in its exterior wall for successive communication with the pressure compartments and in continuous communication with the exhaust compartment.

44. A valve mechanism including a casing having ports leading to opposite ends of a cylinder and an exhaust port, adjustably mounted partitions dividing said casing into two pressure compartments and an exhaust compartment, a rotatably mounted pipe having an opening for successive communication with the pressure compartments and a groove in its exterior wall diametrically opposed to said opening for successive communication with the pressure compartments and in continuous communication with the exhaust compartment.

45. A valve mechanism including a casing having ports leading to opposite ends of a cylinder and an exhaust port, a rotatably mounted pipe having a lateral opening and a groove in its outer wall, partitions mounted in said casing and cooperating with said casing and pipe to provide two arc-shaped pressure compartments and an annular exhaust compartment, the construction and arrangement being such that when the opening in the pipe is in communication with one pressure compartment the other pressure compartment is in communication with the exhaust compartment and vice versa.

46. A valve mechanism including a casing having ports leading to opposite ends of a cylinder and an exhaust port, a rotatably mounted pipe having a lateral opening and a groove in its outer wall, a plurality of adjustably mounted arc-shaped partitions mounted in said casing and cooperating with said casing and pipe to provide two arc-shaped pressure compartments and an annular exhaust compartment, the construction and arrangement being such that when the opening in the pipe is in communication with one pressure compartment the other pressure compartment is in communication with the exhaust compartment, and means for securing said partitions in adjusted positions.

47. A valve mechanism including a casing having ports leading to opposite ends of a cylinder and an exhaust port, a rotatably mounted pipe extending through said casing, said pipe having a lateral opening and a groove in its outer wall, a plurality of adjustably mounted partitions in said casing and forming two pressure compartments and an exhaust compartment, a pair of concentrically arranged annular plates one of which is connected to each partition, and means for securing said plates in adjusted position.

DAVID STENHOUSE.